US008115999B2

(12) United States Patent
Tsai et al.

(10) Patent No.: US 8,115,999 B2
(45) Date of Patent: *Feb. 14, 2012

(54) POLARIZING LAMP

(75) Inventors: Chang-Ching Tsai, Winter Park, FL (US); Shin-Tson Wu, Oviedo, FL (US); Wang-Yang Li, Xinhua (TW); Chung-Kuang Wei, Neihu District (TW)

(73) Assignees: Chimei Innolux Corporation, Miao-Li County (TW); University of Central Florida Research Foundation, Inc., Orlando, FL (US)

( * ) Notice: Subject to any disclaimer, the term of this patent is extended or adjusted under 35 U.S.C. 154(b) by 608 days.

This patent is subject to a terminal disclaimer.

(21) Appl. No.: 12/246,753

(22) Filed: Oct. 7, 2008

(65) Prior Publication Data

US 2010/0085639 A1  Apr. 8, 2010

(51) Int. Cl.
*G02B 27/28* (2006.01)
(52) U.S. Cl. ................... 359/485.05; 359/574
(58) Field of Classification Search .......... 359/485.01, 359/485.03, 485.05, 485.06, 489.19, 566, 359/569, 571, 573–576, 583; 349/67, 70; 362/19, 97.1–97.3, 217.06, 296.08, 296.09, 362/609
See application file for complete search history.

(56) References Cited

U.S. PATENT DOCUMENTS

| 3,631,288 | A | 12/1971 | Rogers | 313/112 |
|---|---|---|---|---|
| 7,583,439 | B2 * | 9/2009 | Tsai et al. | 359/485.03 |
| 7,748,859 | B2 * | 7/2010 | Qi | 362/19 |
| 2010/0226015 | A1 * | 9/2010 | Taira et al. | 359/571 |
| 2010/0265571 | A1 * | 10/2010 | Wang et al. | 359/352 |

OTHER PUBLICATIONS

Bryan-Brown et al., "Polarisation conversion through the excitation of surface plasmons on a metallic grating." *Journal of Modern Optics*, 37(7):1227-1232, 1990.
Hooper et al., "Broadband polarization converting mirror for the visible region of the spectrum" *Optics Letters*, 27(24):2152-2154, Dec. 15, 2002.
Tanase et al., "A new backlighting system using a polarizing light pipe." *IBM Journal of Research and Development*, 42(3/4):1-23, 1998.
Vikuiti Information Brochure on Enhanced Specular Reflector (ESR). Brochure. 3M Corporation, 2 pages, 2002.

* cited by examiner

*Primary Examiner* — Frank Font
(74) *Attorney, Agent, or Firm* — Fish & Richardson P.C.

(57) ABSTRACT

A polarizing lamp includes a polarization beam splitter, a metallic grating reflector having metallic gratings with a trapezoidal profile, and an unpolarized light source positioned between the polarization beam splitter and the metallic grating reflector.

20 Claims, 7 Drawing Sheets

Polarization conversion efficiency Φ=45°

POLARIZING LAMP

At least some of the subject matter disclosed in this patent application was developed under a joint research agreement between Chi Mei Optoelectronics Corporation and the University of Central Florida.

BACKGROUND

The description relates to polarizing lamps.

In some examples, a liquid crystal display includes a backlight unit having cold-cathode fluorescent lamps (CCFL) or light emitting diodes (LED) that generate light that is randomly polarized. Linearly polarized light is used to illuminate the pixels in order to obtain a high contrast ratio. A linear polarizer is used to transmit light having a preferred polarization and absorb light having an undesired polarization. This causes half or more of the light from the backlight unit to be wasted. Light recycling schemes can be used to increase the power utilization.

SUMMARY

In one aspect, in general, unpolarized light is converted into linearly polarized light for use in liquid crystal display (LCD) edge illumination. An unpolarized light source is partially enclosed by a set of metallic grating reflector and a broadband polarization beam splitter for efficient generation of linearly polarized light. The polarized light can be used, for example, to provide edge illumination for liquid crystal displays.

In another aspect, in general, a polarizing lamp includes a randomly polarized tube light source partially enclosed by a metallic grating reflector and a broadband wide-angle polarization beam splitter (PBS). The broadband wide-angle PBS receives an input light beam from the tube light source, passes a transverse magnetic (TM) wave and reflects a transverse electric (TE) wave. The polarizing lamp includes a grating reflector having a high polarization conversion efficiency for receiving the transverse electric field wave and reflecting back an elliptically polarized wave. Each time the TM wave is passed out from the PBS and the TE wave is converted to an elliptical wave, the total power of the TM wave emitting from the polarizing lamp is enhanced.

In another aspect, in general, linearly polarized light is generated using a repetitive polarization conversion process to convert an unpolarized light into linearly polarized TM light. The polarization conversion process includes separating unpolarized light into linearly polarized TE and TM waves by using a PBS, and rotating the TE wave into an elliptic wave by using a polarization converting reflector. The elliptic wave includes TE and TM wave components. The TM waves pass the PBS and are emitted from the lamp, while the TE waves are recycled by the polarization conversion process. The repetitive recycling of TE waves continues as light bounces back and forth between the PBS and the polarization converting reflector such that the light coming out the lamp is substantially linearly polarized TM waves.

In another aspect, in general, a polarizing lamp includes a polarization beam splitter; a metallic grating reflector having metallic gratings with a trapezoidal profile; and an unpolarized light source positioned between the polarization beam splitter and the metallic grating reflector.

Implementations can include one or more of the following features. The trapezoidal profile includes a top width in a range between 50 nm to 70 nm, and a bottom width between 60 nm to 90 nm. The trapezoidal profile includes a height in a range between 110 nm to 140 nm. The metallic gratings have a period that is less than a wavelength of the light generated by the unpolarized light source. The metallic gratings include multi-order diffraction gratings. The polarization beam splitter includes a broadband wide-angle polarization beam splitter. The light source includes a light tube. The gratings extend along a direction at an angle in a range between 40 to 50 degrees relative to a lengthwise direction of the light tube. The polarizing beam splitter reflects transverse electric waves and passes transverse magnetic waves.

The metallic grating reflector has a shape corresponding to a parabolic cylinder, a circular cylinder, a rectangular cylinder, a square cylinder, a triangular cylinder, a trapezoid cylinder, or any combination of the above. The polarization beam splitter includes at least one of prisms, a multi-layered film, a dielectric grating, or a wire-grid structure. The polarization beam splitter has a shape that corresponds to at least one of a rectangular plane, a portion of a parabolic cylinder, a portion of a circular cylinder, a portion of a rectangular cylinder, a portion of a square cylinder, a portion of a triangular cylinder, or a portion of a trapezoid cylinder. The metallic grating reflector includes at least one of metallic surface grating, metallic coated surface gratings, metallic coated multi-layers gratings, or multi-layer volume gratings. The metallic grating reflector includes multi-layer volume gratings having multi-periods composed of alternately materials having different refractive indices.

In another aspect, in general, a display includes a plurality of pixels and a polarizing lamp to illuminate the pixels. The polarizing lamp includes a polarization beam splitter; a parabolic metallic grating reflector having metallic gratings with a trapezoidal profile; and an unpolarized light tube positioned between the polarization beam splitter and the parabolic metallic grating reflector.

Implementations can include one or more of the following features. The trapezoidal profile includes a top width in a range between 50 nm to 70 nm, a bottom width between 60 nm to 90 nm, and a height in a range between 110 nm to 140 nm.

In another aspect, in general, light waves are emitted from an unpolarized light source; portions of the light waves are repeatedly reflected between a metallic grating reflector and a polarization beam splitter, the metallic gratings having a trapezoidal profile; and portions of the light waves having a particular polarization are passed through the polarization beam splitter.

Implementations can include one or more of the following features. Transverse electric waves are reflected from the polarization beam splitter and transverse magnetic waves are passed through the polarization beam splitter. The metallic grating reflector converts transverse electric waves into elliptically polarized waves. Pixels of a display panel are illuminated using the light waves that pass the polarization beam splitter.

Other aspects can include other combinations of the features recited above and other features, expressed as methods, apparatus, systems, program products, and in other ways.

Advantages of the polarizing lamp may include one or more of the following. Monochromatic or chromatic light of any propagation direction and any spectra can be provided when linearly polarized illumination is needed. By use of surface metallic gratings, high polarization conversion efficiency and broadband wide-angle performance can be achieved. With these two characteristics, the light reflected by the metallic grating is highly elliptically polarized. The total intensity of linear polarized light coming out from the polarization beam splitter can be very strong. The light emitted from the unpolarized light source can be completely (or almost completely) linearly polarized with very little loss in intensity.

DETAILED DESCRIPTION

Figure 1:
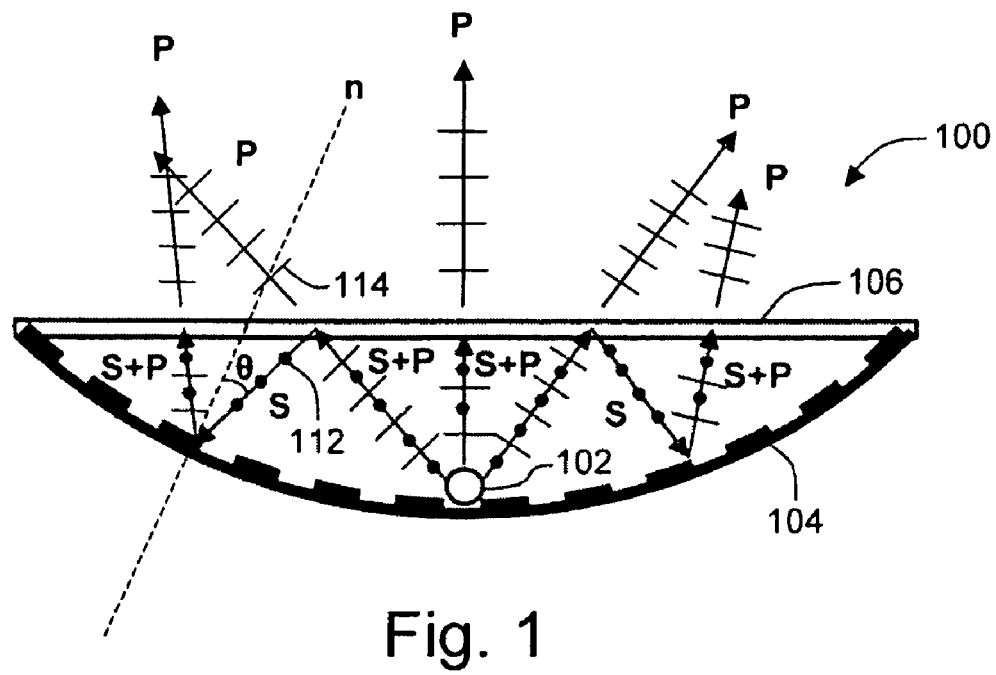
FIG. 1 is a cross-sectional view of an example polarizing lamp.
Figure 2:
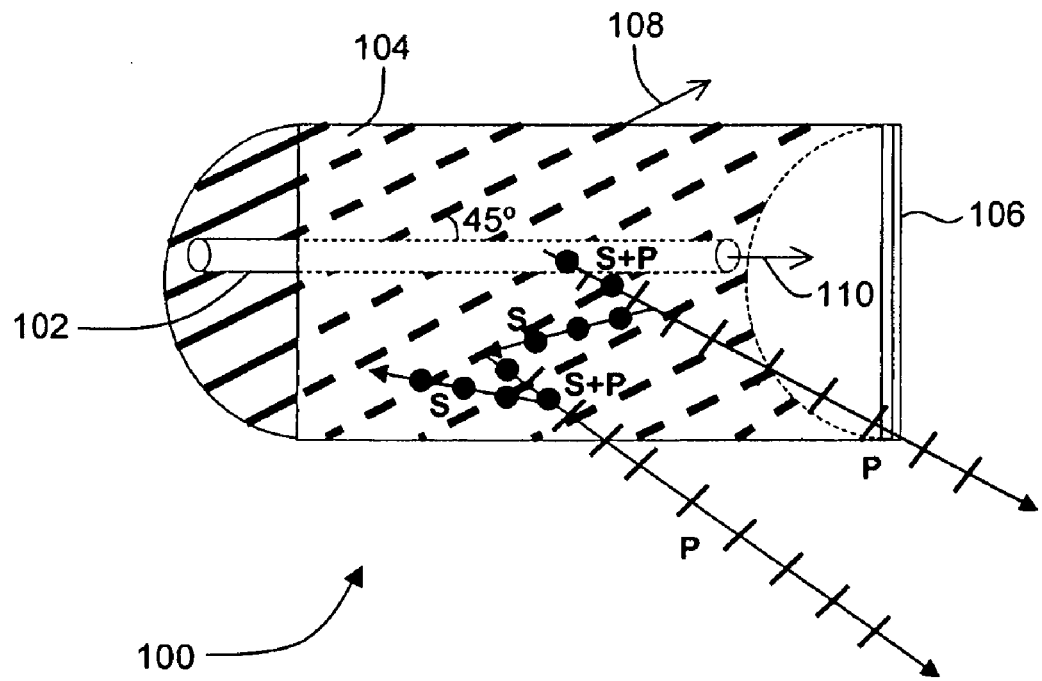
FIG. 2 is a diagram of an example polarizing lamp.

FIGS. 1 and 2 show a cross-sectional view and perspective view, respectively, of a polarizing lamp 100 that can be applied to edge illumination for a liquid crystal display. The light emitted from the polarizing lamp 100 includes mostly linearly polarized transverse magnetic (TM) waves. The polarizing lamp 100 has an overall cylindrical shape and includes an elongated light tube 102 enclosed by a metallic grating reflector (mirror) 104 and a polarization beam splitter (PBS) 106. The metallic grating reflector 104 is made of, e.g., a layer of silver having gratings that form grooves on the surface of the grating reflector 104. In some examples, as shown in FIG. 2, the grooves extend along a direction 108 that is at an angle about 45° with respect to a lengthwise direction 110 of the light tube 102. The metallic grating reflector 104 has a shape of, e.g., a parabolic cylinder and forms a back portion of the polarizing lamp 100. A PBS 106 having, e.g., a planar shape forms a front portion of the polarizing lamp 100.

The light tube 102 emits randomly polarized light, in which each light ray includes transverse electric (TE) wave 112 and transverse magnetic (TM) wave 114 components that have polarization directions orthogonal to each other. In FIGS. 1 and 2, the TE waves 112 are represented by dots (indicating that the polarization of the TE waves is parallel to the surface of the PBS 106) and also referred to as S waves. The TM waves 114 are represented by short line segments and also referred to as P waves. As can be seen in FIGS. 1 and 2, the TE waves 112 are reflected by the PBS 106 whereas the TM waves 114 passes the PBS 106 and are emitted from the polarizing lamp 100.

The light tube 102 can be a fluorescent lamp, and can generate monochromatic or chromatic light. The light tube 102 can be replaced by other kinds of light sources, such as light emitting diodes (LEDs).

Figure 3:
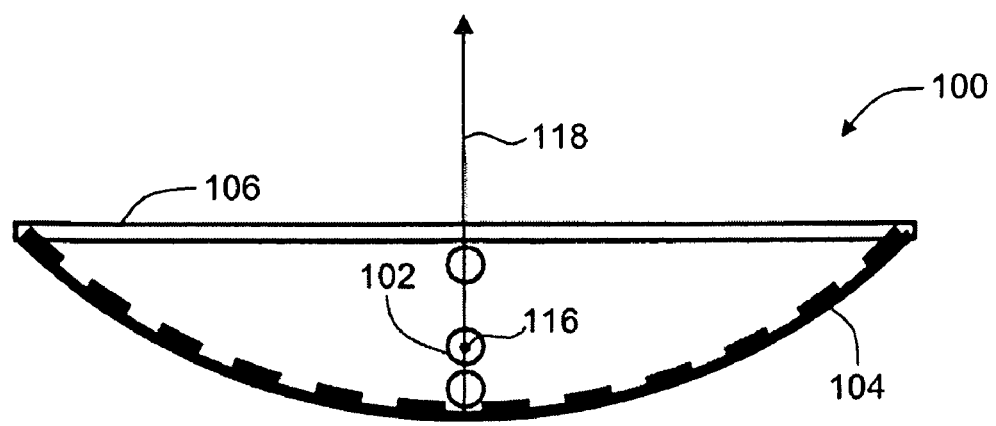
FIG. 3 is a cross-sectional diagram of an example polarizing lamp with various light tube positions.

Referring to FIG. 3, which shows a cross-sectional view of the polarizing lamp 100, the location of light tube 102 can be at the focal point 116 of the parabolic grating mirror 104 or at another point along the parabolic axis 118 of the parabolic grating mirror 104.

Figure 4:
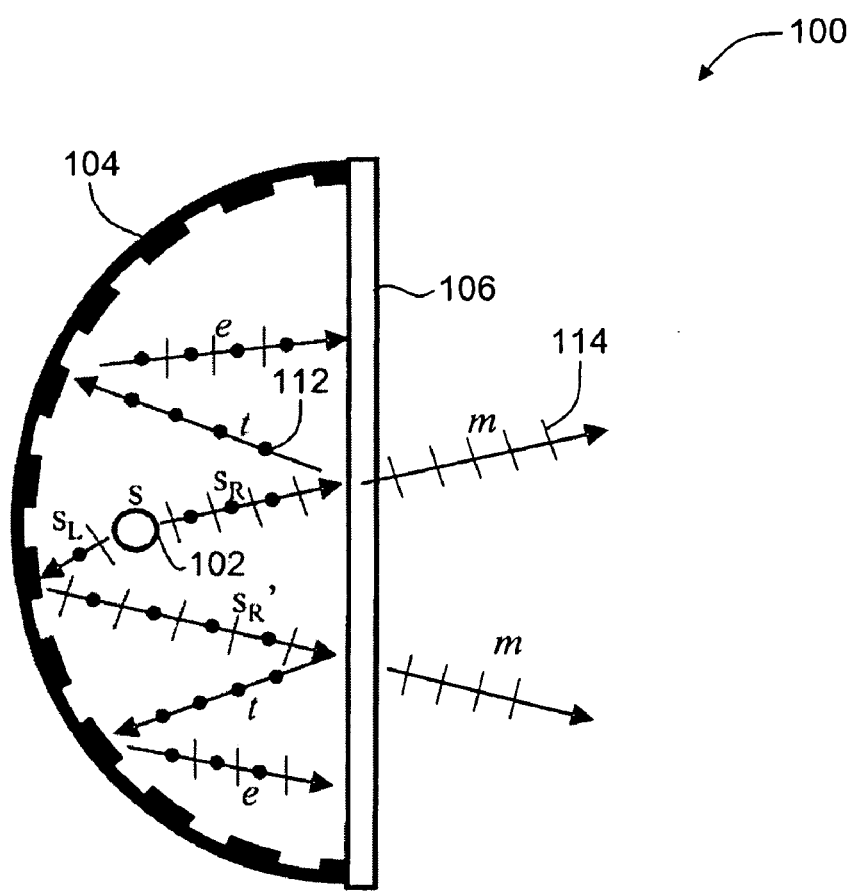
FIG. 4 is a diagram showing example ray paths in the polarizing lamp.

Referring to FIG. 4 (which shows a cross-sectional view of the polarizing lamp 100), a quasi-circular-wavefront unpolarized wave s emits from the light tube and propagates outward from the lamp toward the PBS 106 and the parabolic grating mirror 104. The s wave is divided into leftward propagating waves, such as $S_L$, and rightward propagating waves, such as $S_R$. When the leftward propagating wave $S_L$ reaches the parabolic grating mirror 104, it is reflected and becomes another unpolarized wave $S'_R$ propagating rightward to the PBS 106. For example, the unpolarized wave $S'_R$ can be circularly or elliptically polarized. Whenever the rightward propagating wave $S_R$ or $S'_R$ reaches the PBS 106, the transverse magnetic (TM) component, m wave 114, passes the PBS 106 and is emitted out of the lamp 100, while the transverse electric (TE) component, t wave 112, is reflected back leftward to the metallic grating mirror 104, where the t wave is recycled in a repetitive recycling process. When the t wave is reflected by the grating mirror 104, the t wave is rotated to form a highly elliptically polarized e wave and propagates rightward to the PBS 106. The subsequent m wave portion of the elliptically polarized e wave passes the PBS 106 and the t wave portion is reflected back and propagates leftward to the metallic grating mirror 104. The above describes one cycle of light recycling. By repeating many such cycles, the polarizing lamp 100 generates linear TM polarized light having a high intensity.

Figure 8:
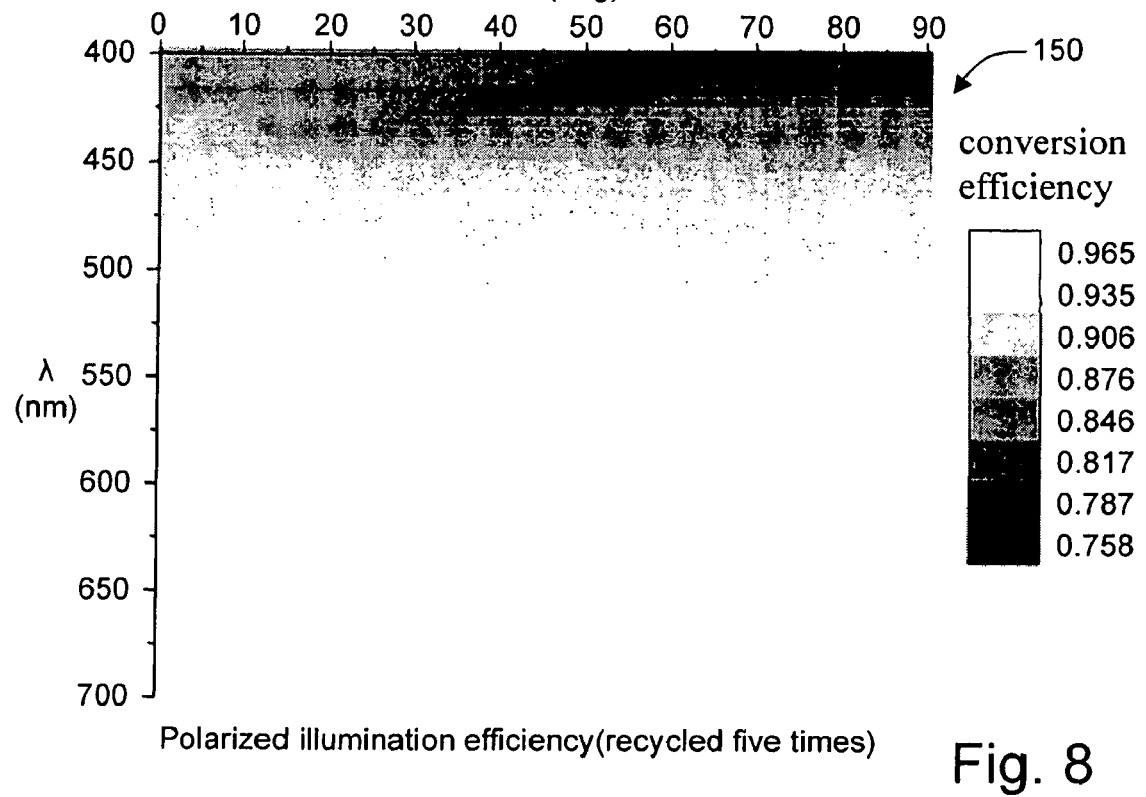

An advantage of using a parabolic grating mirror 104 is that during the first few cycles of ray bouncing, the incident angles at which light is directed toward (and the reflection angles from which light is reflected from) the PBS 106 and the parabolic grating mirror 104 generally remain within a limited range. In some implementations, the grating on the parabolic grating mirror 104 is a subwavelength grating (i.e., the period of the grating is less than the wavelengths of the monochromatic or chromatic light) so that the rays propagating between the PBS 106 and the grating mirror 104 follow the Snell's law. Based on this property ray tracing and calculation of polarization conversion can be calculated for each ray. As an example, after five cycles of light recycling, the average conversion efficiency for linear TM polarized light emitting from the polarizing lamp 100 can reach as high as about 94%, as shown in FIG. 8 below.

Figure 5:
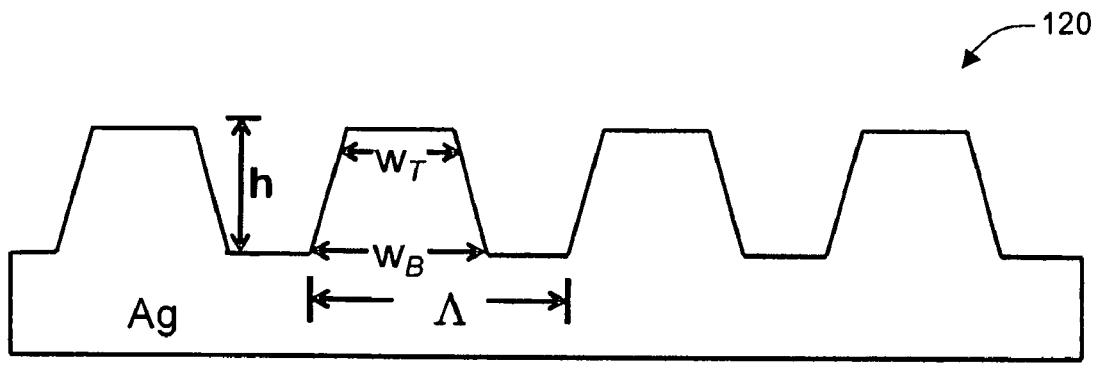
FIG. 5 is a cross-sectional view of example metallic gratings.

FIG. 5 shows a cross-sectional view of an example metallic grating 120 used for the parabolic grating mirror 104. In this example, the metallic grating 120 has a trapezoidal profile having a top width ($w_T$) of 60 nm n, a bottom width ($w_B$) of 70 nm, a height (h) of 124 nm, and a period Λ of 197 nm. The metallic grating 120 can be made of, for example, silver. The dimensions of the metallic grating 120 can be different from what is described above, and the grating can be made of metals or alloys other than silver.

The trapezoid silver grating has a high polarization conversion efficiency for a wide spectrum of light and a wide range of incident angles. The grating structure shown in FIG. 5 can be used for light having various wavelengths covering the whole visible spectrum with a wide incident angle up to 60° or more.

The chosen trapezoidal profile can be determined based on the resonance of surface plasmons coupling with the Fourier expansion orders of the grating vector. The first few Fourier orders of the gratings can be used to estimate the parameters of the trapezoidal profile. The parameters can be fine tuned by adjusting the parameters and performing simulations to determine which adjusted parameters produce the best results.

Figure 6:
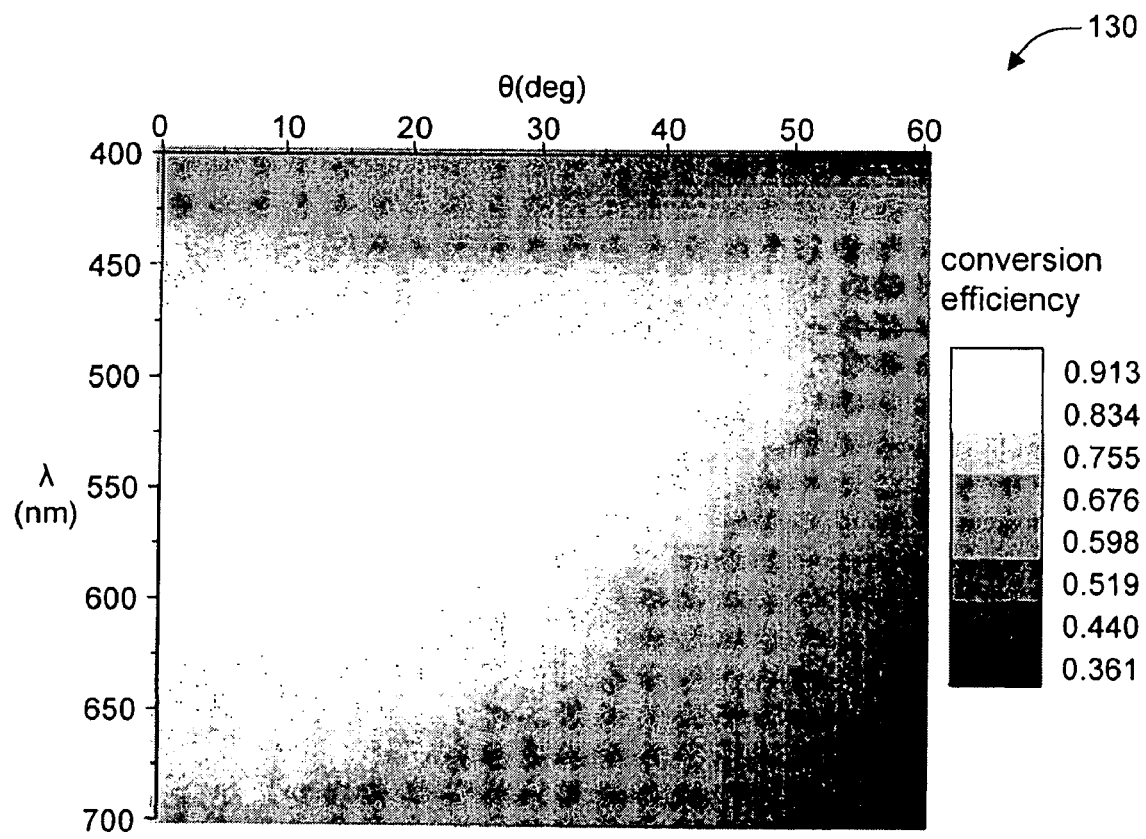
FIGS. 6-8 are graphs.

FIG. 6 is a graph 130 showing simulated results for the broadband wide-angle polarization conversion efficiency of the metallic gratings 120 of FIG. 5 using the parameters shown in FIG. 5. Here, the conversion efficiency represents the percentage of a TE wave that is converted to a circularly or elliptically polarized wave. The vertical axis represents the wavelength of light, and the horizontal axis represents the light incident angle θ shown in FIG. 1. The incident angle θ is the angle between the incident light ray and the normal vector n. In this example, the angle between the direction 108 of the grooves and the lengthwise direction 110 of the light tube 102 is φ=45°, the maximum conversion efficiency is about 91.3%, and the minimum conversion efficiency is about 36.1%.

Figure 7:
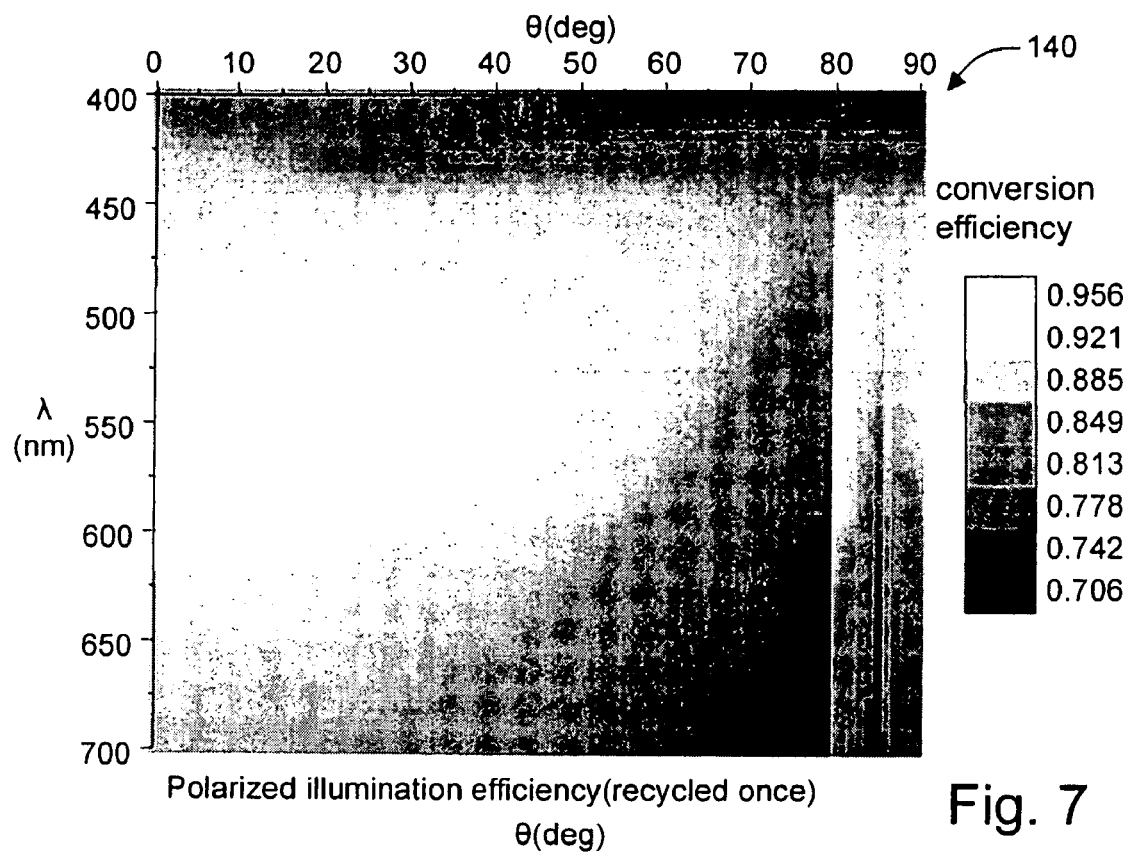

FIG. 7 is a graph 140 showing simulated results for the polarized illumination efficiency for one-time light recycling using the polarizing lamp 100 of FIGS. 1 and 2. In this simulation, it is assumed that the polarizing lamp 100 has a metallic grating reflector 104 with metallic gratings 120 that has a profile shown in FIG. 5. The vertical axis represents the wavelength of light, and the horizontal axis represents the light incident angle θ. In this simulation, the maximum conversion efficiency is about 95.63%, the minimum conversion efficiency is about 70.64%, and the average conversion efficiency is about 87.46%.

FIG. 8 is a graph 150 showing simulated results for the polarized illumination efficiency when light has been recycled for five times using the polarizing lamp 100 of FIGS. 1 and 2. The vertical axis represents the wavelength of light, and the horizontal axis represents the light incident angle θ. In this simulation, the parameters of the polarizing lamp 100 are the same as those for the simulation of FIG. 7. The maximum conversion efficiency is about 96.49%, the minimum conversion efficiency is about 75.76%, and the average conversion efficiency is about 93.54%. This shows that, after several cycles of ray bouncing between the PBS 106 and the metallic grating reflector 104, the polarization conversion efficiency is greatly enhanced and insensitive to the incident angle and wavelength of light.

In the simulations of FIGS. 7 and 8, the unpolarized light tube 102 is located along the parabolic axis 118 and adjacent to the metallic grating reflector 104.

Figure 9:
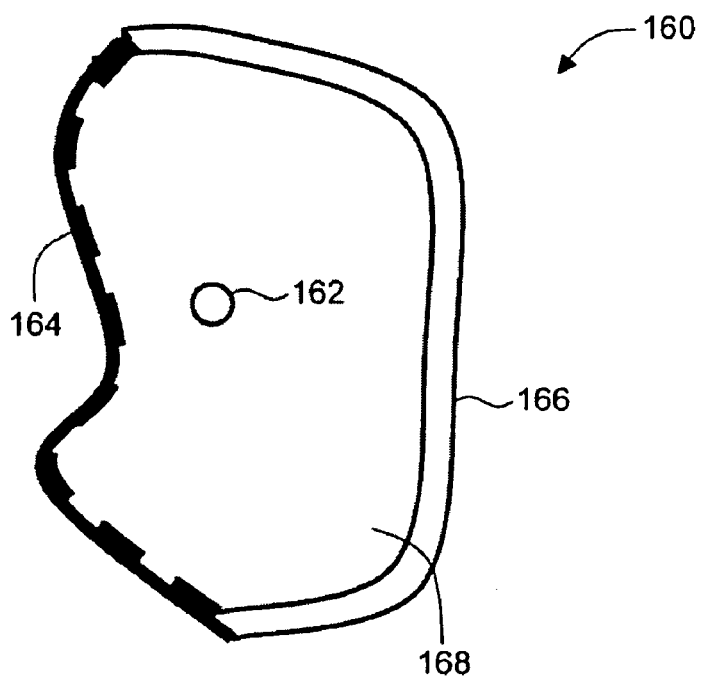
FIG. 9 is a diagram of an example polarizing lamp.

Referring to FIG. 9, in some implementations, a polarizing lamp 160 includes a light source 162 to provide unpolarized light, a reflector 164, and a broadband wide-angle polarization beam splitter (PBS) 166. The light source 162 is enclosed by the reflector 164 and the PBS 166. The reflector 164 performs polarization conversion, and the PBS 166 separates the TE and TM components of the non-linear-polarized light. The PBS 166 and the reflector 164 join together to form a closed space 168 within which the unpolarized light source 162 is placed. The light source 162, the reflector 164, and the PBS 166 each can have an arbitrary shape.

Figure 10:
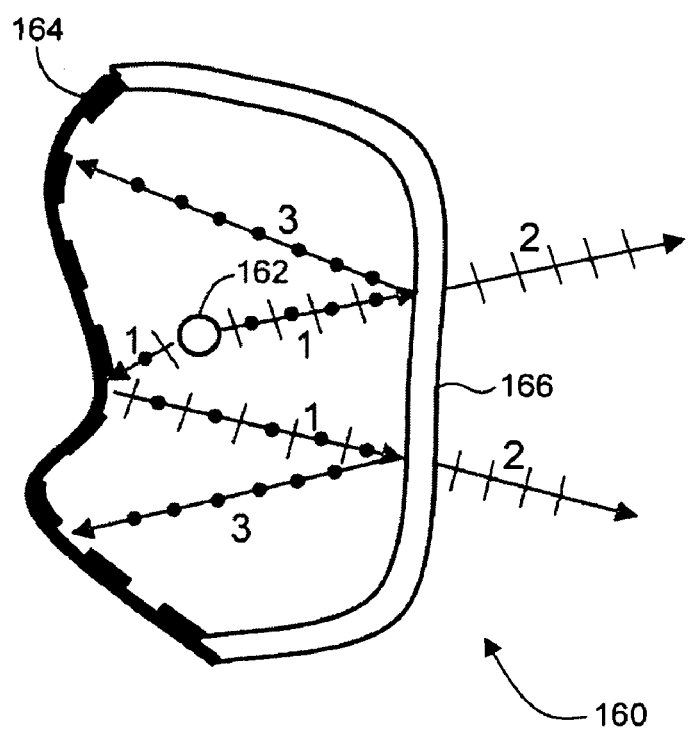
FIG. 10 is a diagram showing an example initial step for light recycling in a polarizing lamp.

The process of generating linearly polarized light includes an initial step and subsequent repetitive steps. Referring to FIG. 10, the initial step includes receiving a randomly unpolarized light 1 directly emitted from the light source 162 or indirectly reflected from the polarization converting reflector 164 at the polarization beam splitter 166. A transverse magnetic (TM) wave 2 passes through the polarization beam splitter 166, and a transverse electric (TE) wave 3 is reflected from the polarization beam splitter 166 to the polarization converting reflector 164.

Figure 11:
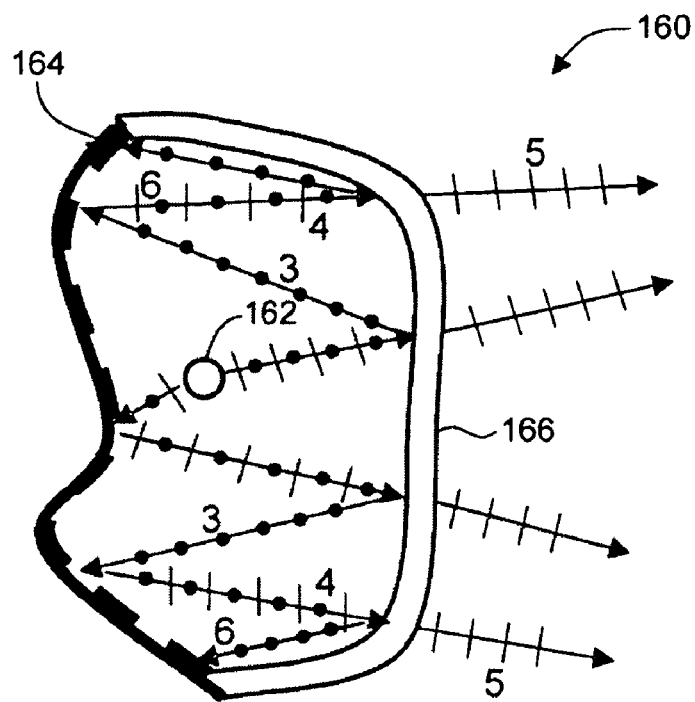
FIG. 11 is a diagram showing example repetitive steps for light recycling in a polarizing lamp.

Referring to FIG. 11, after the initial step, the repetitive steps include receiving the initial reflected TE wave 3 at the polarization converting reflector 164 and reflecting an elliptically polarized wave 4 from the polarization converting reflector 164 back to the PBS 166. The reflected elliptically polarized light 4 is received at the PBS 166, the TM wave 5 passes through out the PBS 166, and the TE wave 6 is reflected toward the polarization converting reflector 164. The process of bouncing rays between the PBS 166 and the polarization converting reflector 164 and passing out TM waves 5 from the PBS 166 is repeated several times, generating a high intensity linearly polarized light (TM waves 5) from the polarizing lamp 160.

The PBS 166 can be replaced by other optical elements, such as a device made of prisms, an optical device having multi-layered films, a dielectric gratings, or wire-grid structure. For example, the shape of the polarization beam splitter can be a rectangular plane, or a portion of a parabolic cylinder, a circular cylinder, a rectangular cylinder, a square cylinder, a triangular cylinder, a trapezoid cylinder or any combination of these shapes. The polarization conversion reflector can be a diffraction gratings or reflective diffuser. The shape of polarization conversion reflector can be a portion of a parabolic cylinder, a circular cylinder, a rectangular cylinder, a square cylinder, a triangular cylinder, a trapezoid cylinder or any combination of these shapes.

The reflective diffraction grating can be a diffraction grating having alternating parallel protrusions and recesses. For example, the groove can have a shape of a stair-case having two or three steps. The reflective diffraction grating can be a metallic surface grating (e.g., a grating made of metal only), a metal-coated surface grating (e.g., a grating made of a material, such as glass, coated with metal), a metal-coated multi-layered surface grating (e.g., a grating made of a material, such as glass, coated with several layers of metals), a non-metallic reflective material (e.g., a reflective polymer grating), or a multi-layers volume grating (e.g., a grating made of hundreds or thousands of layers such that its thickness is much larger than the incident wavelength). The reflective diffraction grating can be a diffractive grating having sub-wavelength grating periods (e.g., a grating structure having a pitch that is shorter than the incident light wavelength to produce one order of diffracted waves) or a diffractive grating having multi-diffraction orders (e.g., a grating structure having a pitch greater than the incident light wavelength to produce more than one order of diffractive waves). The structure of surface grating can have alternative shapes such as binary (e.g., rectangular gratings), sinusoidal, parabolic, triangular and Gaussian shape. The multi-layers volume grating can have multi-periods composed of alternating materials having different refractive indexes.

Figure 12:
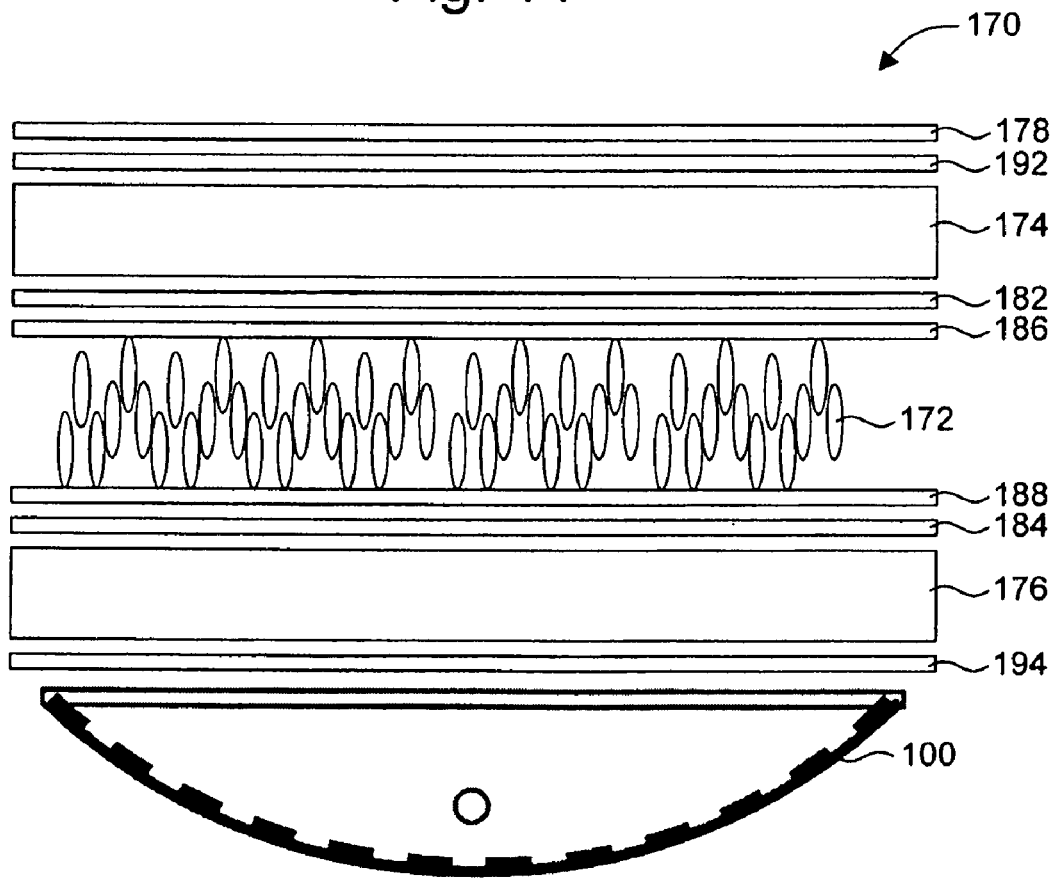
FIG. 12 is a cross-sectional diagram of an example display.

FIG. 12 is a cross-sectional diagram of an example liquid crystal display 170 having pixels that each includes a liquid crystal layer 172 positioned between an upper substrate 174 and a lower substrate 176 that are parallel to each other. The outer side of the upper substrate 174 includes an upper linear polarizer 178. The inner sides of the substrates 174 and 176 have transparent electrodes 182 and 184 coated with alignment layers 186 and 188, respectively. One or more compensation films, such as 192 and 194, can be used to increase a viewing angle of the display 170. A polarizing lamp 100 is used as a backlight module to generate linearly polarized light that is modulated by the various layers. Data voltage signals are applied between the electrodes 182 and 184 of the pixels to control the orientations of liquid crystal molecules in the liquid crystal layer 172 of the pixels to control the gray scale levels of the pixels, enabling the pixels to show specified images. The polarizing lamp 100 can also be used in other types of displays.

Figure 13:
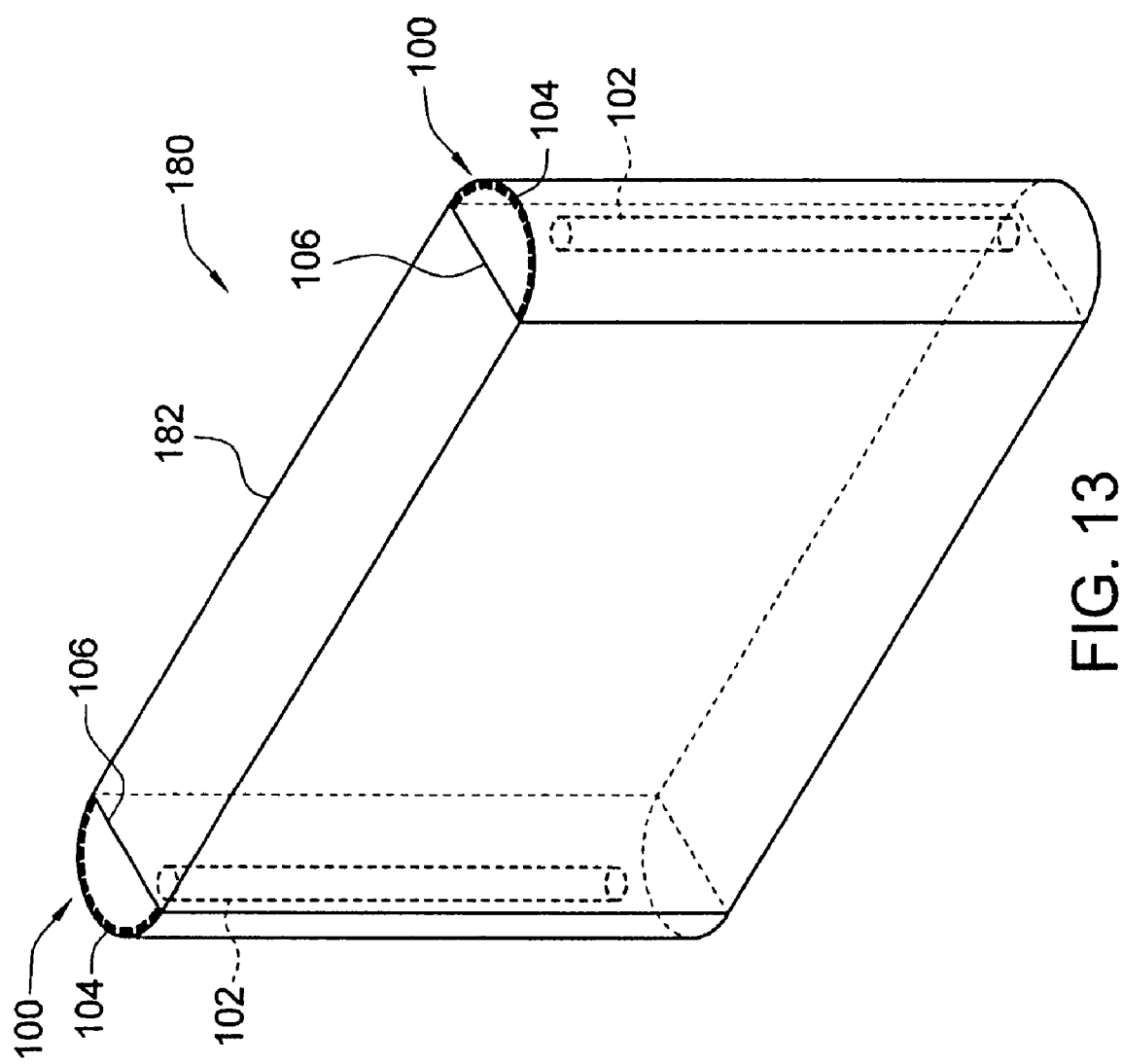
FIG. 13 is a diagram of an example display using polarizing lamps for edge illumination.

FIG. 13 is a diagram showing an example display 180 using the polarizing lamp 100 for edge illumination. Two polarizing lamps 100 are positioned at left and right edges, respectively, of the display 180. In each polarizing lamp 100, an unpolarized light source 102 generates non-polarized light waves that are reflected multiple times between a metallic grating reflector 104 and a polarization beam splitter 106. TM waves passes the PBS 106 while TE waves are recycled. The polarizing lamp 100 generates highly linearly polarized TM light waves that are directed toward a central portion 182 of the apparatus 180. The central portion 182 may include, e.g., reflectors and diffusers (not shown) that redirect the polarized light waves to illuminate pixels (not shown) of the display 180.

A number of embodiments of the invention have been described. Nevertheless, it will be understood that various modifications may be made without departing from the spirit and scope of the invention. For example, alternative types of diffraction gratings of different shapes and materials can be used. Instead of using a metallic grating reflector, reflective diffusers can also be used. Other implementations and applications are also within the scope of the following claims.

What is claimed is:

1. An apparatus comprising:
    a polarizing lamp comprising:
    a polarization beam splitter;
    a metallic grating reflector having metallic gratings with a trapezoidal profile; and
    an unpolarized light source positioned between the polarization beam splitter and the metallic grating reflector.

2. The apparatus of claim 1 in which the trapezoidal profile comprises a top width in a range between 50 nm to 70 nm, and a bottom width between 60 nm to 90 nm.

3. The apparatus of claim 1 in which the trapezoidal profile comprises a height in a range between 110 nm to 140 nm.

4. The apparatus of claim 1 in which the metallic gratings have a period that is less than a wavelength of the light generated by the unpolarized light source.

5. The apparatus of claim 1 in which the metallic gratings comprise multi-order diffraction gratings.

6. The apparatus of claim 1 in which the polarization beam splitter comprises a broadband wide-angle polarization beam splitter.

7. The apparatus of claim 1 in which the light source comprises a light tube.

8. The apparatus of claim 7 in which the gratings extend along a direction at an angle in a range between 40 to 50 degrees relative to a lengthwise direction of the light tube.

9. The apparatus of claim 1 in which the polarizing beam splitter reflects transverse electric waves and passes transverse magnetic waves.

10. The apparatus of claim 1 in which the metallic grating reflector has a shape corresponding to a parabolic cylinder, a circular cylinder, a rectangular cylinder, a square cylinder, a triangular cylinder, a trapezoid cylinder, or any combination of the above.

11. The apparatus of claim 1 in which the polarization beam splitter comprises at least one of prisms, a multi-layered film, a dielectric grating, or a wire-grid structure.

12. The apparatus of claim 1 in which the polarization beam splitter has a shape that corresponds to at least one of a rectangular plane, a portion of a parabolic cylinder, a portion of a circular cylinder, a portion of a rectangular cylinder, a portion of a square cylinder, a portion of a triangular cylinder, or a portion of a trapezoid cylinder.

13. The apparatus of claim 1 in which the metallic grating reflector comprises at least one of metallic surface gratings, metallic coated surface gratings, metallic coated multi-layers gratings, or multi-layer volume gratings.

14. The apparatus of claim 1 in which the metallic grating reflector comprises multi-layer volume gratings having multi-periods composed of materials alternately arranged to have different refractive indices.

15. A display comprising:
    a plurality of pixels;
    a polarizing lamp to illuminate the pixels, the polarizing lamp comprising:
    a polarization beam splitter;
    a parabolic metallic grating reflector having metallic gratings with a trapezoidal profile; and
    an unpolarized light tube positioned between the polarization beam splitter and the parabolic metallic grating reflector.

16. The display of claim 15 in which the trapezoidal profile comprises a top width in a range between 50 nm to 70 nm, a bottom width between 60 nm to 90 nm, and a height in a range between 110 nm to 140 nm.

17. A method comprising:
    emitting light waves from an unpolarized light source;
    repeatedly reflecting portions of the light waves between a metallic grating reflector and a polarization beam splitter, the metallic gratings having a trapezoidal profile; and
    passing portions of the light waves having a particular polarization through the polarization beam splitter.

18. The method of claim 17, comprising reflecting transverse electric waves from the polarization beam splitter and passing transverse magnetic waves through the polarization beam splitter.

19. The method of claim 17, wherein the metallic grating reflector converts transverse electric waves into elliptically polarized waves.

20. The method of claim 17, comprising illuminating pixels of a display panel operating on light waves that pass the polarization beam splitter.

* * * * *